United States Patent [19]

Lehmann

[11] 4,222,255
[45] Sep. 16, 1980

[54] ROLLING DEVICE HAVING AT LEAST ONE CONTROLLED DEFLECTION ROLL

[75] Inventor: Rolf Lehmann, Rudolfstetten, Switzerland

[73] Assignee: Escher Wyss Aktiengesellschaft, Zurich, Switzerland

[21] Appl. No.: 24,468

[22] Filed: Mar. 26, 1979

[30] Foreign Application Priority Data

Apr. 18, 1978 [CH] Switzerland .......................... 4119/78

[51] Int. Cl.³ ...................... B21B 37/08; B21B 13/14; B21B 29/00
[52] U.S. Cl. ........................................ 72/20; 72/243; 72/245
[58] Field of Search ....................... 72/241, 245, 20, 6, 72/243

[56] References Cited

U.S. PATENT DOCUMENTS

| | | | |
|---|---|---|---|
| 4,059,976 | 11/1977 | Crist et al. ............................... | 72/19 |
| 4,074,024 | 2/1978 | Blornstad et al. .................... | 72/20 X |
| 4,167,964 | 9/1979 | Flury ..................................... | 72/241 |

FOREIGN PATENT DOCUMENTS 51-110464  9/1976  Japan ......................................... 72/243

*Primary Examiner*—Milton S. Mehr
*Attorney, Agent, or Firm*—Werner W. Kleeman

[57] ABSTRACT

A rolling device or mill having a controlled deflection roll possessing a fixed support and a radially movable roll shell rotatable about the fixed support. Between the roll shell and the material to be rolled there is located an intermediate roll having journals supported at the framework by means of pressure sensors or feelers. The contact force of the controlled deflection roll is regulated such that the journals of the intermediate roll are load relieved. There is thus formed a compensation between the contact force of the roll and the reaction force of the material. The support of the journals in the framework can be adjusted in dependency upon the measurement of the thickness of the rolled material.

8 Claims, 4 Drawing Figures

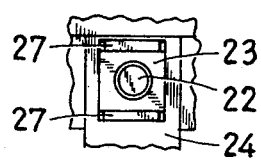
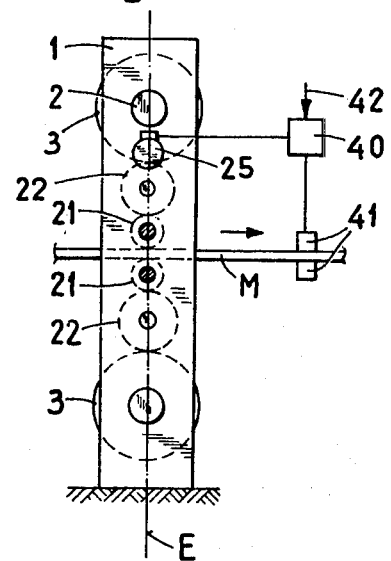
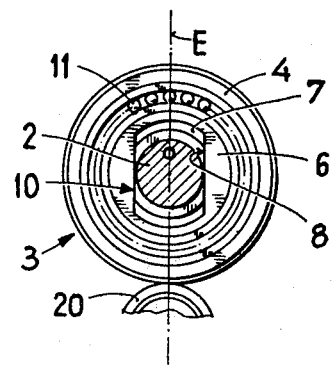

ROLLING DEVICE HAVING AT LEAST ONE CONTROLLED DEFLECTION ROLL

BACKGROUND OF THE INVENTION

The present invention relates to a new and improved construction of rolling device or rolling mill for processing web-like material. In its more specific aspects, the invention concerns a rolling device or mill which is of the type comprising at least one controlled deflection roll—sometimes referred to in the art as a roll with bending compensation—embodying a support fixedly supported in a frame-work and a roll shell or barrel rotatable about the fixed support and radially movable in a pressure plane. The roll shell is supported at the stationary support with the aid of hydrostatic pressure or support element exposed to the action of a hydraulic pressurized medium infed from a pressurized fluid medium source. Further, there is provided an intermediate roll, by means of which the controlled deflection roll exerts pressure onto the rolled web or web-like material.

Controlled deflection rolls of this type heretofore were only used for rolling suitable, web-like or in general elongate material, such as typically for instance paper, plastics or metal, with a desired pressure or contact force. If there should be produced a given thickness of the rolled material, then, for instance, as taught in U.S. Pat. No. 4,074,624, granted Feb. 21, 1978, the thickness of the rolled material must be measured and thereafter there must be appropriately set the pressure of the contact rolls.

SUMMARY OF THE INVENTION

It is a primary object of the present invention to improve upon such type of rolling mill which, for instance, has been proposed in the copending U.S. application Ser. No. 847,601, filed Nov. 1, 1977, to which reference may be readily had and the disclosure of which is incorporated herein by reference.

Another significant object of the present invention is to render possible operation of the rolling mill with a given roll gap, which can be automatically retained, and wherein the pressure force of the controlled deflection roll can be accommodated to the load produced by the rolled material, without causing bending of the rolls.

Still a further significant object of the present invention aims at the provision of a new and improved construction of rolling mill which is relatively simple in construction and design, economical to manufacture, extremely reliable in operation, not readily subject to breakdown or malfunction, requires a minimum of maintenance and servicing and enables the pressure or contact force of the controlled deflection rolls to be accommodated to the load generated by the rolled material, without causing any bending-through of the rolls.

Now in order to implement these and still further objects of the invention, which will become more readily apparent as the description proceeds, the invention contemplates supporting the ends of the intermediate roll in the framework in a given position upon pressure sensors. The controlled deflection roll is subdivided by pressure or support elements into at least two zones or regions, each of which extends essentially over one half of the axial length of the controlled deflection roll and is connected to a separate line or conduit carrying the hydraulic pressurized fluid medium. The pressure sensors influence, by means of regulators, the pressure of the pressurized fluid medium in a manner such that in each case the ends of the intermediate rolls are relieved of load.

Consequently, the intermediate roll assumes the attributes of an actual measuring roll, by means of which the force produced by the rolled material can be compared with the contact force of the roll exerting the pressure, whereafter both forces can be compensated or equalized. In this way there can be produced an appreciably more rapid reaction during changes in the forces, and thus, a more uniform rolling action than would be the case if there were accomplished the measurement at the rolled product at a later point in time, particularly since force changes, for instance brought about by thickness variations at the incoming material web or band, can be immediately corrected without deformation of the rolls.

However, it is possible to provide at least two measuring devices arranged at the marginal or edge regions of the rolled web of the like, in order to measure the thickness of the rolled web. Operatively associated with these measuring devices are regulators having adjustment mechanisms for adjusting the position of the ends of one of the intermediate rolls.

In this way there can be obtained a further increase in the working accuracy of the equipment, since, for instance, deformations due to different thermal expansions and so forth, can be subsequently corrected. Moreover, the ends of the intermediate roll can be mounted in the framework by means of carriages or slides which can be adjusted in the pressure plane by the adjustment mechanisms, and each adjustment mechanism is activated by the related regulator which is influenced by the therewith operatively correlated thickness measuring device. The controlled deflection roll can be provided with a device for adjusting the axial length of the region of the roll which is impinged with the pressurized fluid medium.

These measures, which basically have already been disclosed in the aforementioned U.S. application Ser. No. 847,601, leads to an increase in the accuracy of the rolling mill, since the effective width of the contact force of the roll can be accommodated to the width of the article to be rolled.

Preferably, the rolling mill can possess two groups of rolls which act against one another, each roll group having a controlled deflection roll and an intermediate roll. However, it is also possible to have an arrangement wherein there is provided coaction of a controlled deflection roll and an intermediate roll with one or a number of solid work rolls.

The contemplated measures wherein a work or working roll is arranged between the intermediate roll and the rolled material, and which corresponds to the illustrated embodiment, affords the advantage that the intermediate roll is free of drive torques, and additionally, such can be held extremely small, since the work roll can have a smaller diameter than the intermediate roll. However, it should be understood that the intermediate roll can be driven and can directly serve as the work roll.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 is a view of the arrangement of FIG. 1, looking in the direction of the arrow II thereof;

FIG. 3 is a cross-sectional view of the arrangement of FIG. 1, taken substantially along the line III—III thereof; and FIG. 4 is a side view of the equipment shown in FIG. 1, shown on a reduced scale.

DETAILED DESCRIPTION OF THE PREFERRED EMBODIMENTS

Figure 1:
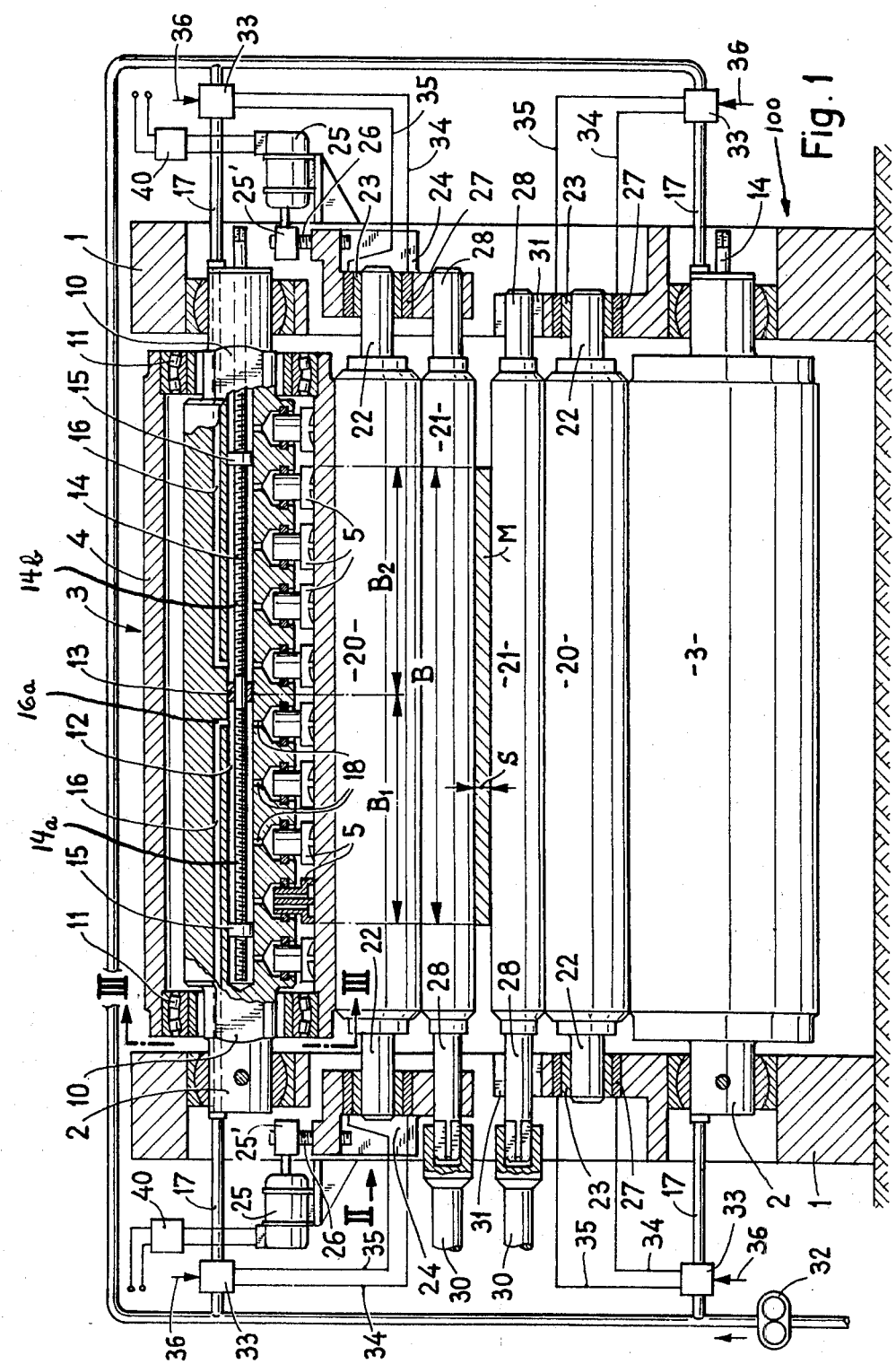
FIG. 1 is a schematic vertical sectional view of a rolling device or rolling mill constructed according to the invention.

Describing now the drawings, it is to be understood that only enough of the rolling mill has been shown to enable those skilled in the art to readily understand the underlying principles and concepts of the invention. More specifically, turning to FIG. 1, the schematic sectionally illustrated showing of rolling mill will be seen to comprise a framework or support arrangement, generally indicated by reference character 100, having the side elements 1 at which there are appropriately pivotably supported, however secured against rotation, the supports 2 of hydrostatic controlled deflection rolls 3. Both of the controlled deflection rolls 3, which can be constructed in accordance with the teachings of U.S. Pat. No. 3,802,044 granted Apr. 9, 1974, to which reference may be readily had and the disclosure of which is incorporated herein by reference, contain essentially tubular-shaped roll shells or barrels 4 which are rotatable about the related support 2 and are supported, in the contact or pressure direction, upon hydrostatic piston-like pressure or support elements 5 which simultaneously serve to produce the contact pressure. The ends of each of the roll shells 4 are guided by means of guide discs or plates 6, as shown in FIG. 3, at the related support 2 in the direction of the pressure plane E. For this purpose, the guide discs or plates 6 possess elongate openings 7 having flat or planar guide surfaces 8 which coact with likewise flat guide surfaces 10 at the related support 2. The roll shells 4 are mounted in associated roller bearings 11 at their guide discs or plates 6. This construction of controlled deflection roll is known to the art from U.S. Pat. No. 3,885,283, granted May 27, 1975, to which reference may be readily had and the disclosure of which is incorporated herein by reference. Furthermore, as is equally known in the art, the ends of each roll shell can be closed by not particularly illustrated closure plates to prevent the escape of hydraulic pressurized fluid medium, typically oil.

In FIG. 3, for reasons of clarity in illustration, there has only been shown in sectional view the upper one of the two illustrated controlled deflection rolls 3, but it is however to be expressly understood that both of these controlled deflection rolls 3 are of the same construction.

The support 2 of the controlled deflection roll 3 is provided with an axial bore 12 which is sealing divided at the center of such roll by a partition or separaton wall 13. Mounted in the partition wall 13 is a threaded screw or rod 14 or equivalent structure, which is provided to the left and right of the partition wall 13 with threading 13 and 14b, respectively, having opposite pitch. Upon the threading or threaded portions 14 and 14b there are screwed to both sides of the partition wall 13 the closure plates 15 which, in this manner and as should be evident, can be moved towards the center of the related controlled deflection roll 3 or away from such center by appropriately rotating the threaded screw or rod 14. At the intermediate region of the support 2 there are located the mouths 16a of the bores or channels 16 for the hydraulic pressurized fluid medium and which are connected with the pressure line or conduits 17. By adjusting the closure plates 15 it is possible to determine which of the pressure or support elements 5 have infed thereto pressurized fluid medium by means of the connection bores 18 leading from the central bore 12. Consequently, it is possible to simultaneously determine the width B at which there is effective the pressure or contact force of the controlled deflection rolls 3, and such simultaneously is subdivided into two zones $B_1$ and $B_2$.

As also clearly evident by referring to FIG. 1, each controlled deflection roll 3 has operatively associated therewith an intermediate roll 20 which is supported at or bears upon the related controlled deflection roll 3. These controlled deflection rolls 3 exert, by means of the intermediate rolls 20, pressure upon the work or working rolls 21 between which there is located the rolled material or web M. The work rolls 21, during operation, are located at a spacing which corresponds to a work gap or nip S which should be maintained.

The intermediate rolls 20 are each provided with journals or pins 22, the ends of which, as shown in FIG. 2, are rotatably mounted in bearing blocks 23 or equivalent structure. The bearing blocks 23 of the lower intermediate roll 20 are supported in the side elements or parts 1 of the framework or support arrangement 100. The bearing blocks 23 of the upper intermediate roll 20 are supported in a carriage or slide 24 or equivalent structure which is guided to be vertically movable at the related side elements 1 and can be adjusted by means of a drive motor 25 acting upon a suitable power transmission or gearing composed of, for instance, a nut 25' and screw 26. The bearing blocks 23 are supported by means of pressure sensors or feelers 27 which can be conventionally constructed and, for instance, constituted by standard pressure cells or dynamometers.

The work rolls 21 have journals 28, wherein at the ends of the left-hand journals 28 there operatively engages a further suitable drive 30, for instance a driven Cardan shaft. The journals 28 of the upper work roll 21 are mounted in the carriage 24, in order to prevent dropping of the related roll when the work gap S is open. The lower work roll 21 bears upon the lower intermediate roll 20 and is laterally guided in the bearings 31.

It should be understood that for lateral guiding of the rolls 20 and 21 there can be provided conventional guide devices, in order to retain the axes of such rolls in the pressure or rolling plane E. Such can be constructed in accordance with the teachings of the already mentioned U.S. application Ser. No. 847,601.

Referring again to FIG. 1, and as apparent from the illustration thereof, the pressure lines or conduits 17 are connected with a pressurized fluid medium source 32. In each pressure line 17 there is additionally arranged a pressure regulator 33 which is acted upon by signal lines 34 and 35 leading from the pressure measuring elements or sensors 27 of the related roll and at the related side. Each regulator 33, during normal operation, regulates the pressure of the pressurized fluid medium in the related line or conduit 17 in such a manner that the corresponding journal 22 of the intermediate roll 20 is load relieved, i.e., that the pressure sensors 27 of a journal 22 deliver the same measuring signals. In this case there is established an equilibrium or balance between the contact or pressure force of the pressure elements 5 of the controlled deflection rolls 3 and the reaction force of the rolled material M, so that there is maintained the gap S. However, there is possible an operating state wherein, prior to infeeding the web-like or elongate material M, the rolls are pre-loaded, i.e., deformed in a direction towards one another, so as to prepare such rolls for any sudden infeed or material M, In this case the regulator 33 regulates the pressure at the related line or conduit 17 such that a desired difference exists between the measuring signals of the signal lines 34 and 35, and which difference can be determined by a reference signal 36.

In accordance with the showing of FIGS. 1 and 4, with the inventive apparatus there is further available the possibility of adjusting the gap S during operation, and particularly for correcting the same due to changes caused by thermal deformations and so forth.

For this purpose the motors 25 are connected by means of regulators 40 at their not particularly referenced power or current sources, and one such regulator 40 has been shown in FIG. 4. These regulators 40 are exposed to the action of the measuring signals delivered by thickness measuring devices 41 for measuring the thickness of the rolled material M and also to reference value signals 42. The thickness measuring devices 41 can preferably be arranged at the edges of the rolled web-like or elongated material M, and they influence, in each case, the regulator 40 and motor 25 at the related side. Actuation of the motors 25, and thus, the adjustment of the carriages or slides 24 is therefore undertaken based upon the measured values of the related measuring devices 41. As already discussed it is thus possible to correct changes of the desired size of the gap S, arising during operation, for instance due to influences of stress elongation or thermal elongation of the framework.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A rolling mill for rolling a web of material comprising;
   framework means;
   at least one controlled deflection roll supported by said framework means;
   said controlled deflection roll comprising;
   a support fixedly mounted at said framework means;
   a roll shell rotatable about said fixed support and radially movable in a pressure plane;
   hydrostatic pressure elements for supporting the roll shell upon said support;
   means for infeeding hydraulic pressurized fluid medium to said hydrostatic pressure element;
   an intermediate roll for exerting pressure from the controlled deflection roll to a web of material which is being rolled;
   said intermediate roll having opposed ends;
   pressure sensors at which there are supported the ends of the intermediate roll in a given position at said framework means;
   means cooperating with said pressure elements for subdividing the controlled deflection roll into at least two zones;
   each zone extending over a predetermined axial extent of the controlled deflection roll;
   said infeeding means including a separate line for the hydraulic pressurized fluid medium with which there is operatively connected each zone;
   regulator means cooperating with said pressure sensors;
   said pressure sensors influencing, by means of said regulator means, the pressure of the pressurized fluid medium such that the ends of the intermediate rolls are load relieved.

2. The rolling mill as defined in claim 1, wherein:
   each zone extends approximately over one half of the axial extent of the controlled deflection roll.

3. The rolling mill as defined in claim 1, further including:
   at least two measuring devices arranged at marginal regions of the rolled web of material in order to measure the thickness of the rolled web of material; and further regulator means provided with adjustment means coacting with said measuring devices in order to adjust the position of the ends of the intermediate roll.

4. The rolling mill as defined in claim 3, further including:
   carriage means adjustable in the pressure plane by said adjustment means for mounting the ends of the intermediate roll in the framework means;
   each adjustment means being activated by its related further regulator means in response to the related thickness measuring device.

5. The rolling mill as defined in claim 1, wherein:
   said means cooperating with said pressure elements include mechanism provided for the controlled deflection roll for adjusting the axial length of the region of the controlled deflection roll which is impinged by the pressurized fluid medium.

6. The rolling mill as defined in claim 1, further including:
   two oppositely actuating groups of rolls each including a respective controlled deflection roll and intermediate roll.

7. The rolling mill as defined in claim 1, further including:
   a work roll arranged between the intermediate roll and the rolled web of material.

8. A rolling mill for rolling a web of material comprising;
   framework means;
   at least one controlled deflection roll supported by said framework means;
   said controlled deflection roll comprising;
   a support fixedly mounted at said framework means;
   a roll shell rotatable about said fixed support and radially movable in a pressure plane;
   hydrostatic pressure elements for supporting the roll shell upon said support;
   means for infeeding hydraulic pressurized fluid medium to said hydrostatic pressure elements;
   an intermediate roll for exerting pressure from the controlled deflection roll to a web of material which is being rolled;
   said intermediate roll having opposed ends;

pressure sensors at which there are supported the ends of the intermediate roll in a given position at said framework means;

said pressure elements being arranged to provide at least two zones for the controlled deflection roll;

each zone extending over a predetermined axial extent of the controlled deflection roll;

said infeeding means including a separate line for the hydraulic pressurized fluid medium with which there is operatively connected each zone;

regulator means cooperating with said pressure sensors;

said pressure sensors influencing, by means of said regulator means, the pressure of the pressurized fluid medium such that the ends of the intermediate rolls are load relieved.

* * * * *